Aug. 28, 1962  S. D. WILTSE  3,051,500

O RING STRUCTURE

Filed Sept. 16, 1957

INVENTOR.
SUMNER D. WILTSE
BY
Whittemore, Hulbert & Belknap
ATTORNEYS

United States Patent Office 3,051,500
Patented Aug. 28, 1962

3,051,500
O RING STRUCTURE
Sumner D. Wiltse, 4943 Ridgewood Ave., Detroit, Mich.
Filed Sept. 16, 1957, Ser. No. 684,245
4 Claims. (Cl. 277—228)

This invention relates generally to fluid-tight connections, and refers more particularly to an improved O ring for forming a fluid-tight seal between a length of tubing or pipe and a fitting therefor.

One of the essential objects of the invention is to provide a composite elastic O ring capable of (1) preventing leakage between the tubing and fitting while permitting relative tilting or angular movement of either the tubing or the fitting, (2) resisting compression, and (3) holding the tubing against outward end-thrust and thereby preventing such tubing from being accidentally withdrawn or pressure-blown from said fitting.

Another object is to provide a composite ring of the type mentioned having an annular core of rubber or rubber-like material or rubber composition and an outer annular metallic cage for said core.

Another object is to provide a composite ring wherein the cage is formed from a spiral wire spring having convolutions that are substantially circular in cross section and that are substantially uniform in diameter throughout the circumference of the cage.

Another object is to provide a composite ring wherein the core is molded as a filler within and between the convolutions of the wire spring forming the cage.

Another object is to provide a composite ring wherein the annular cage provides a fulcrum for the relative tilting or angular movement of either the tubing or the fitting.

Another object is to provide a composite ring that is simple in construction, economical to manufacture, and efficient in operation.

Other objects, advantages and novel details of construction of this invention will be made more apparent as this description proceeds, especially when considered in connection with the accompanying drawing, wherein.

Figure 1:
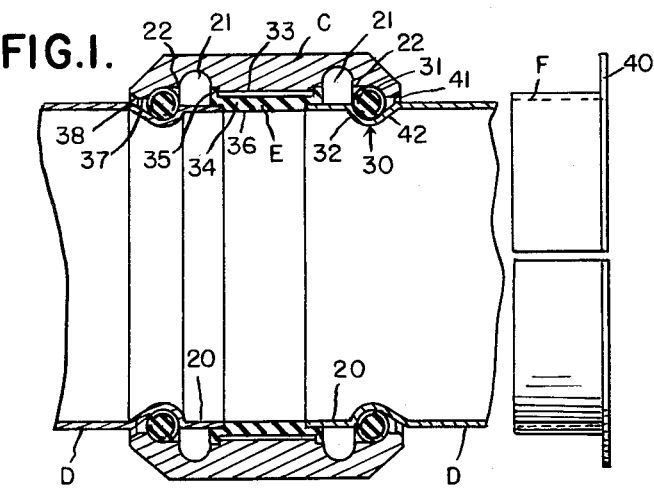
FIGURE 1 is a vertical longitudinal sectional view through a fully assembled connection embodying my invention; showing portions of the tubing broken away, and showing one of the split rings that is employed during the assembly and disassembly of said connection.
Figure 5:
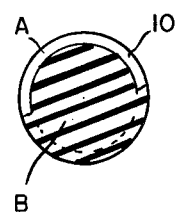
FIGURE 5 is a sectional view taken substantially on the line 5—5 of FIGURE 4.
Figure 2:
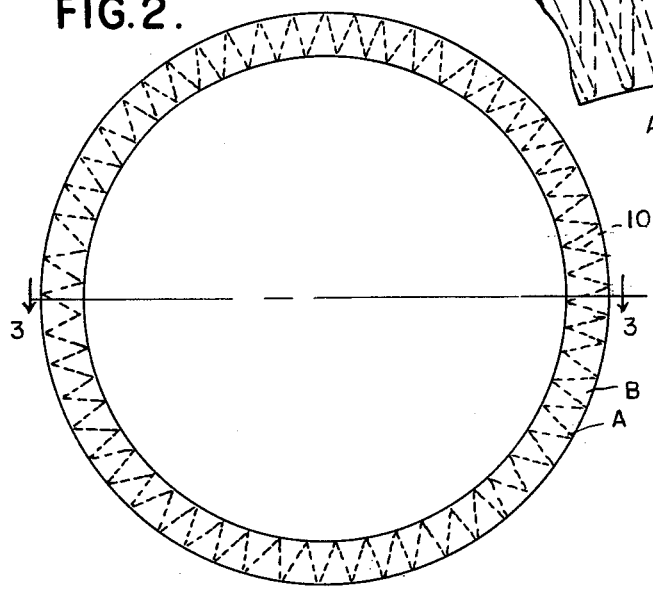
FIGURE 2 is a planned view of one of the composite rings illustrated in FIGURE 1.
Figure 4:
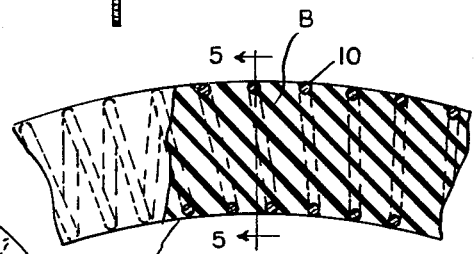
FIGURE 4 is an enlarged fragmentary view of the composite ring, with parts broken away and in section.
Figure 3:
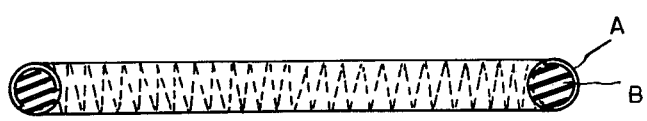
FIGURE 3 is a sectional view taken substantially on the line 3—3 of FIGURE 2.

In the drawing, A is the outer annular metallic cage, and B is the annular resilient core of a composite elastic ring embodying my invention.

As shown, the cage A is a hollow or tubular helix and is formed from a spiral wire spring having convolutions 10 that are substantially circular in cross section. Such convolutions 10 are also substantially uniform in diameter throughout the circumference of the cage and are embedded in the periphery of and serve as a retainer for the core B.

The core B is formed from a body of rubber or rubber-like material or rubber composition and is molded as a filler within and between the convolutions 10 of the wire spring forming the cage A.

In the present instance, two composite rings are employed between the fitting C and two lengths D of tubing or pipes to provide fluid-tight seals therebetween. However, it is apparent that one or more composite rings may be employed wherever desired and in couplings or connections of various types.

As shown, the fitting C is an elongated annulus of any suitable material such as cast metal, and is adapted to receive adjacent end portions 20 of the lengths D of tubing, and a compressible and deformable annular insert or spacer E of resilient material such as cellular sponge of foam rubber.

Preferably, the fitting C is provided at opposite ends of the insert E with identical inwardly opening outwardly projecting relatively deep annular grooves or channels 21 adapted to initially receive the elastic rings while the parts are being assembled, and is provided at the outer sides of said grooves 21 with identical inwardly opening outwardly projecting relatively shallow annular grooves or recesses 22 that connect or open into the outer sides of the grooves 21 and are adapted to receive the elastic rings when the parts are finally assembled.

The adjacent end portions 20 of the lengths D of tubing are substantially straight and have in their periphery identical outwardly opening inwardly projecting preformed annular grooves or channels 30 adapted to receive the elastic rings.

The outer sides 31 of the annular recesses 22 in the fitting C and the inner sides 32 of the grooves 30 in the lengths D of tubing are curved and are substantially at diametrically opposite sides of and are snugly engaged by the elastic rings when the parts are finally assembled.

Normally, the resilient insert E is spaced slightly from a centrally located inwardly projecting annular enlargement or pilot portion 33 of the fitting C, and has an inwardly projecting centrally located annular portion 34 fitting snugly between and forming seals with the adjacent end portions 20 of the lengths D of tubing. As shown, this insert or spacer E has at opposite ends thereof outwardly projecting annular attaching flanges 35 that straddle and engage opposite ends of the enlargement or pilot portion 33 of the fitting. Preferably, the outer sides of the attaching flanges 35 are substantially flush with and form continuations of the inner sides of the grooves 21 in the fitting, and the inner surface 36 of the inwardly projecting annular portion 34 is substantially flush with and forms a continuation of the inner surfaces of the lengths D of tubing.

To facilitate the assembly and disassembly of the parts, the fitting C has at the outer sides of the annular recesses 21 annular entrance portions 37 having beveled or tapered outer ends 38. Each annular entrance portion 37 has a diameter slightly larger than the external diameter of the end portions 20 of the lengths D of tubing to not only permit the end portions 20 of such lengths to be inserted into the fitting C, but to also permit short lengths of longitudinally split rings or cooperating semi-circular members F to be inserted within the fitting C, as set forth in my companion application filed September 16, 1957, and bearing Serial No. 684,113, now abandoned, and my application filed February 4, 1960, bearing Serial No. 6,697 constituting a continuation-in-part of my application Serial No. 684,113. Such members F may be used while the parts are being assembled or disassembled to temporarily retain the elastic rings in the grooves 21 in the fitting C during insertion or withdrawal of the lengths D of tubing relative to the fitting, and so that such members may be sleeved upon and serve as guides for the lengths D of tubing when the end portions 20 thereof are inserted into or withdrawn from the fitting.

Preferably, the split rings F are provided at their outer ends with laterally projecting annular flanges 40 that serve as finger pieces by which the split rings may be conveniently manipulated.

Normally, the inside diameter of each elastic ring is slightly less than the outside diameter of each of the annular grooves 30 in the end portions 20 of the lengths D of tubing, so that the rings will fit tightly in the grooves 30. However, such elastic rings are expansible radially and are capable of being stretched to encircle the split rings F when the latter are inserted into the fitting C while the parts are being assembled.

In use, the composite rings, in cooperation with the diametrically opposed curved portions 31 and 32 respectively of the fitting and tubing will form fluid-tight seals that will effectively prevent leakage between the fitting and the lengths of tubing. The cage A of each composite ring will resist compression, and thus such composite rings will also hold the lengths D of tubing against outward end-thrust, and thereby will prevent any accidental withdrawal of the lengths D of tubing endwise from the fitting C. In fact, if there is any outward end-thrust, then the seal affected becomes firmer and stronger. Such composite rings, in cooperation with the grooves 30 and recesses 22, will also maintain the seals between the spacer E and the lengths D of tubing. Also, the composite rings serve as fulcrums for the lengths D of tubing, and the clearance or annular spaces 41 between the inclined sides 42 of the grooves 30 and the beveled end portions 38 of the fitting C will permit angular or universal movement of the lengths D of tubing relative to the fitting C about said fulcrums, without any danger of leakage.

The lengths D of tubing are also relieved of any binding strains and stresses, especially in the event of any misalignment. Such connection also relieves the lengths of tubing from fatigue and possible breakage adjacent the fitting. Also, the composite rings reduce noise transmission as they cushion and dampen vibration.

What I claim as my invention is:

1. An article of manufacture comprising a composite two-part elastic radially expansible and contractible substantially non-compressible circumferentially stretchable shear resisting sealing O-ring of uniform circular radial cross section throughout its circumference, one part aforesaid of said O-ring being an annulus consisting of an endless solid elongated member of circular shape and constituting an annular core of said O-ring, said annulus having a uniform circular radial cross section throughout its circumference, being formed of stretchable resilient material, and having a circular center line, the other part aforesaid of said O-ring being an annulus consisting of an endless substantially tubular reinforcing cage for the first mentioned annulus, the second mentioned annulus having the same circular shape and having the same uniform circular radial cross section as the first mentioned annulus, the second mentioned annulus having a circular center line coinciding with the circular center line of the first mentioned annulus and disposed in a plane at substantially right angles to the axis of said O-ring, the cage of the second mentioned annulus consisting of an endless strand having along the coincident center lines of the first and second mentioned annuluses circumferentially spaced interconnected helical convolutions of uniform diameter extending substantially radially and embedded in the surfaces of all sides of the first mentioned annulus, each of the convolutions of said strand having an outside diameter equal to the outside diameter of the endless elongated member so that the exterior surfaces respectively of the elongated member and cage aforesaid are flush with each other and provide said O-ring with a continuous relatively smooth composite exterior surface throughout its circumference.

2. The article defined in claim 1, wherein the reinforcing strand of the cage of the second mentioned annulus is formed from wire, and the elongated member of the first mentioned annulus completely fills said cage and has throughout the circumference of the second mentioned annulus portions between the convolutions of the cage.

3. The article defined in claim 1, wherein the elongated member of the first mentioned annulus is formed of rubber-like material, and the reinforcing strand of the cage of the second mentioned annulus is formed from elastic material to enable said first and second mentioned annuluses to expand and contract radially in unison.

4. An annulus comprising an annular endless core member having a circular center line and formed of rubber-like material, said annular core member having a substantially circular surface, and a reinforcing member embedded in the circular surface of said annular core member and consisting of an annular endless helix having a circular center line and formed from wire, the circular center line of said annular helix extending circumferentially of and coinciding with the circular center line of said annular core member, said annular helix having along the coincident center lines aforesaid circumferentially spaced interconnected helical convolutions, each having a surface substantially flush with the circular surface of said annular core member.

References Cited in the file of this patent

UNITED STATES PATENTS

| 1,984,806 | Pfefferle | Dec. 18, 1934 |
| 2,385,156 | Newell | Sept. 18, 1945 |

FOREIGN PATENTS

| 1,138,633 | France | June 17, 1957 |